US008495425B2

(12) United States Patent
Alderman et al.

(10) Patent No.: US 8,495,425 B2
(45) Date of Patent: Jul. 23, 2013

(54) SYSTEM AND METHOD TO EFFICIENTLY IDENTIFY BAD COMPONENTS IN A MULTI-NODE SYSTEM UTILIZING MULTIPLE NODE TOPOLOGIES

(75) Inventors: David W. Alderman, Rochester, MN (US); Mitchell D. Felton, Rochester, MN (US); Karl M. Solie, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 338 days.

(21) Appl. No.: 13/037,891

(22) Filed: Mar. 1, 2011

(65) Prior Publication Data

US 2012/0226943 A1    Sep. 6, 2012

(51) Int. Cl.
*G06F 11/30* (2006.01)

(52) U.S. Cl.
USPC ............................................. 714/25; 714/4.1

(58) Field of Classification Search
USPC .................................................. 714/25, 4.1
See application file for complete search history.

(56) References Cited

U.S. PATENT DOCUMENTS

| | | | |
|---|---|---|---|
| 2003/0097438 A1* | 5/2003 | Bearden et al. | 709/224 |
| 2003/0204786 A1 | 10/2003 | Dinker et al. | |
| 2004/0255185 A1 | 12/2004 | Fujiyama et al. | |
| 2005/0060598 A1* | 3/2005 | Klotz et al. | 714/4 |
| 2005/0246569 A1* | 11/2005 | Ballew et al. | 714/4 |
| 2006/0179340 A1* | 8/2006 | Gunnels et al. | 714/4 |
| 2008/0155324 A1* | 6/2008 | Gooding et al. | 714/25 |
| 2009/0052334 A1* | 2/2009 | Gunnels et al. | 370/242 |
| 2009/0073988 A1* | 3/2009 | Ghodrat et al. | 370/395.53 |
| 2009/0292951 A1* | 11/2009 | Fournier et al. | 714/37 |
| 2010/0146342 A1* | 6/2010 | Davenport et al. | 714/47 |
| 2011/0231707 A1* | 9/2011 | Davenport et al. | 714/37 |
| 2012/0250984 A1* | 10/2012 | Taylor | 382/162 |

OTHER PUBLICATIONS

International Search Report and Written Opinion of the ISA dated Jul. 12, 2012—International Application No. PCT/IB2012/050155.
Brown et al.; An Active Approach to Characterizing Dynamic Dependencies for Problem Determination in a Distributed Environment; Integrated Network Management Proceedings; 2001; pp. 377-390; Seattle, WA.
Chen et al.; Pinpoint: Problem Determination in Large, Dynamic Internet Services; Dependable Systems and Networks; 2002; pp. 595-604.
Robb, John; Journal: Good Node, Bad Node; Global Guerrillas, http://globalguerrillas.typepad.com/ globalguerrillas/2009/01/journal-good-node-bad-node.html; Jan. 14, 2009.
k-means clustering; Wikipedia; http://en.wikipedia.org/wiki/K-means_clustering.

* cited by examiner

*Primary Examiner* — Chae Ko
(74) *Attorney, Agent, or Firm* — Stachler Intellectual Property Law LLC

(57) ABSTRACT

The exemplary embodiments of the present invention provide a method for efficiently identifying the bad component(s) in a multi-node system. The method includes assigning a unique ID to each of a plurality of nodes on the multi-node system, generating test statistics from a test on a plurality of nodes, and comparing the test statistics for the plurality of nodes against a first topology to generate a first number of clusters of bad nodes. The method further includes comparing the test statistics for the plurality of nodes against a second topology to generate a second number of clusters of bad nodes, and identifying the bad nodes by comparing the cluster sizes to a topology threshold.

20 Claims, 4 Drawing Sheets

SYSTEM AND METHOD TO EFFICIENTLY IDENTIFY BAD COMPONENTS IN A MULTI-NODE SYSTEM UTILIZING MULTIPLE NODE TOPOLOGIES

FIELD OF THE INVENTION

This invention generally relates to methods and apparatus for efficiently identifying the bad component(s) in a multi-node system and particularly to a topology analysis system.

DESCRIPTION OF BACKGROUND

Typically, multi-node, high performance computing (HPC) systems can include several thousand nodes. This increases the probability that one or more nodes and/or components in the system could be "bad", meaning there could be problems with the processor core, memory subsystem, I/O subsystem, messaging framework, and the like. With all of the nodes or components, it can be very difficult to identify which parts of a multi-node system need to be fixed or replaced. The identification process can take a long time and become very costly.

Currently, several methods have been proposed to identify bad nodes in a multi-node system. One such method is a voting system that identifies and votes off bad nodes. These voting systems are very costly in terms of resources. In one scenario, good nodes are forced to expend resources while bad nodes are not. This will lessen the burden on the good nodes and therefore is less costly.

While these methods describe how to dynamically identify dependencies between components of the system, they do not scale down to the lower hardware and software levels required when identifying bad nodes in a multi-node high-performance computing system. In addition, none of the current methods are able to compare the same results in different contexts.

SUMMARY OF THE INVENTION

Embodiment of the present invention provides a system and method for efficiently identifying the bad component(s) in a multi-node system. Embodiment of the present invention can also be viewed as providing a method for efficiently identifying the bad component(s) in a multi-node system. One embodiment of such a method, among others, can be broadly summarized by the following steps. Assigning a unique ID to each of a plurality of nodes on a multi-node system, generating test statistics from a test on a plurality of nodes and comparing the test statistics for the plurality of nodes against a first topology to generate a first number of clusters of bad nodes. The method further includes comparing the test statistics for the plurality of nodes against a second topology to generate a second number of clusters of bad nodes, and identifying the bad nodes by comparing the cluster sizes to a topology threshold.

Embodiment of the present invention can also be viewed as providing a system for efficiently identifying the bad component(s) in a multi-node system. Briefly described, in architecture, another embodiment of the system, among others, can be implemented as follows. This system includes a tangible storage medium readable by an instruction processing system and storing instructions for execution by the instruction processing system. The system further includes an assigning module that assigns a unique ID to each of a plurality of nodes on the multi-node system, a test module that generates test statistics from a test on a plurality of nodes a first topology analysis module that compares the test statistics for the plurality of nodes against a first topology to generate a first number of clusters of bad nodes. The system further includes a second topology analysis module that compares the test statistics for the plurality of nodes against a second topology to generate a second number of clusters of bad nodes, and a bad node identification module that identifies the bad nodes by comparing the cluster sizes to a topology threshold.

A further exemplary embodiment includes a computer program product for efficiently identifying the bad component(s) in a multi-node system. The computer program product including a tangible storage medium readable by a computer system and storing instructions or execution by the computer system for performing a method. The method includes assigning a unique ID to each of a plurality of nodes on the multi-node system, generating test statistics from a test on a plurality of nodes, and comparing the test statistics for the plurality of nodes against a first topology to generate a first number of clusters of bad nodes. The method further includes comparing the test statistics for the plurality of nodes against a second topology to generate a second number of clusters of bad nodes, and identifying the bad nodes by comparing the cluster sizes to a topology threshold.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
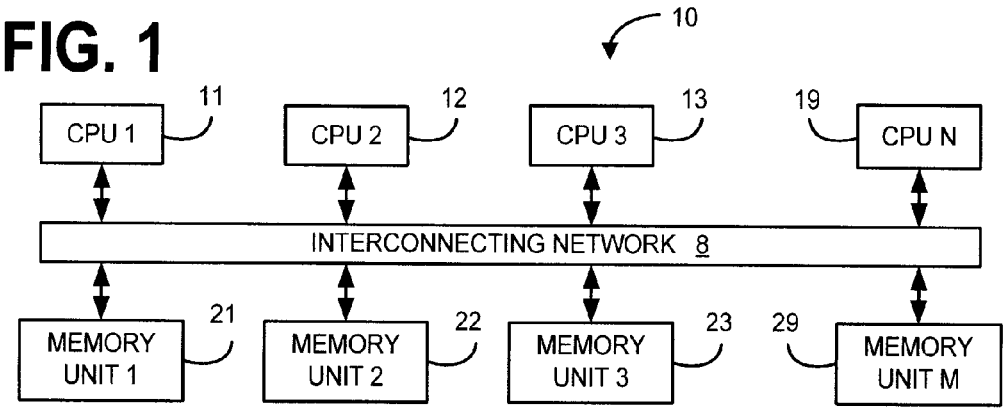
FIG. 1 illustrates one example of a block diagram of a multi-node computing system configuration utilizing the topology analysis of the present invention.

The detailed description explains the preferred embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art.

The shortcomings of the prior art are overcome and additional advantages are provided through a system and method for efficiently identifying the bad component(s) in a multi-node computing system. The nodes are first given a unique ID that does not change. Next, the nodes are mapped out in several different topologies according to various relationships between the nodes. The topologies are based on physical relationships (e.g. they have communication links between them) and logical relationships (e.g. the nodes are neighbors in an MPI communicator). These topologies are then used to interpret the results of a test that can identify the locations where problems occur. Comparisons to determine good and bad nodes could be based on data integrity, execution time, temperature, etc. As bad nodes are identified, they are flagged in the various known topologies. A clustering algorithm, such as a k-means algorithm for example, can then be used to help identify meaningful clusters of bad nodes. If meaningful clusters appear in a given topology, certain components can be identified as potentially bad and either repaired, replaced or flagged for additional targeted testing.

Advantages of the multiple topology methodology include the ability to analyze both physical and logical topologies (message passing interface (MPI) communicator groups, memory chips, cables, and the like). Utilizing multiple topology methodology has the further advantage of only requiring a single test to be run, since the test results can be reused for each topology. Moreover, the multiple topology methodology does not require specialized tests for testing each set of function. All that is required is for nodes to be marked as pass/fail at the end of the test.

For example, a multi-node computing system consisting of 64 nodes could be mapped out according to network connectivity and then according to shared memory usage. After running a test on the system that identifies bad results on a number of nodes, the results can be marked on the various topologies. The network connectivity topology may show disparate clusters, but the shared memory topology may show a single cluster that coincides with a specific memory controller. The identification of the memory controller could be used to either perform additional targeted testing on that memory controller, perform some kind of repair, or it could be swapped out with another one and retested.

The exemplary embodiments of the present invention provide that whatever test is able to identify the bad nodes, it is first run on the entire system (good nodes and bad nodes). This test on the entire system will get a full set of data for the entire domain for all topologies. In one exemplary embodiment, each node will run the test and supply its result. In those instances where no response is supplied, the test would be considered a failure for that node or component. An external topology analyzer would then consolidate the statistics about node IDs and pass/fail results and would iteratively map out the nodes using the available node topologies. A clustering method is performed to search for clusters of bad nodes on each topology. The clusters are then matched up against the logical/physical component identifiers for each topology to identify potentially bad components. Those identified components can then have further action taken against them to correct the problem.

FIG. 1 is a block diagram illustrating a configuration of a multi-node computing system 10 utilizing the topology analysis system and methods of the present invention. The configuration contains a multi-node computing system 10 coupled via an interconnecting network 8. Illustrated in this exemplary embodiment is a parallel processing system suitable for storing and/or executing program code containing multiple CPUs (11-19) coupled directly or indirectly to memory units (21-29) through an interconnecting network 8.

The memory units (21-29) can include local memory employed during actual execution of the program code, bulk storage, and cache memories which provide temporary storage of at least some program code in order to reduce the number of times code must be retrieved from bulk storage during execution. Input/output or I/O devices (including, but not limited to keyboards, displays, pointing devices, etc.) can be coupled to the system either directly or through intervening I/O controllers. Network adapters may also be coupled to the system to enable the multi-node computing system 10 to become coupled to other data processing systems or remote printers or storage devices through intervening private or public networks. Modems, cable modem and Ethernet cards are just a few of the currently available types of network adapters.

Coupled to the CPUs (11-19) and the memory units (21-29) is an interconnecting network 8. The interconnecting network 8 manages, for example, the transfer of information between the CPUs (11-19), the memory units (21-29), and/or the CPUs (11-19) and the memory units (21-29).

While the present invention is not limited to any particular hardware or software platform, in an exemplary embodiment the multi-node computing system 10 may constitute an IBM™ BlueGene/L (BGL) or P (IBM and BlueGene are trademarks of IBM Corporation). The interconnecting network 8 forwards data between CPUs 11-19 on multi-node computing system 10. The interconnecting network 8 may be an internal network, such as one or more specialized networks, local area network (LAN) within an organization, an external network, or a combination of both and may have other physical machines or devices (not shown) coupled to it.

As is known, CPUs (11-19) are the controlling center of the multi-node computing system 10. The CPUs (11-19) execute at least one operating system ("OS") which controls the execution of programs and processing of data. Examples include but are not limited to an OS such as IBM z/OS™, z/VM™, AIX™ operating systems, WINDOWS NT™ or a UNIX™ based operating system such as the Linux™ operating system (z/OS, z/VM and AIX are trademarks of IBM Corporation; WINDOWS NT is a registered trademark of Microsoft Corporation; UNIX is a registered trademark of The Open Group in the United States and other countries; Linux is a trademark of Linus Torvalds in the United States, other countries, or both). As described below, the operating system is one component of the multi-node computing system 10 that can incorporate and use the capabilities of the present invention.

Figure 2:
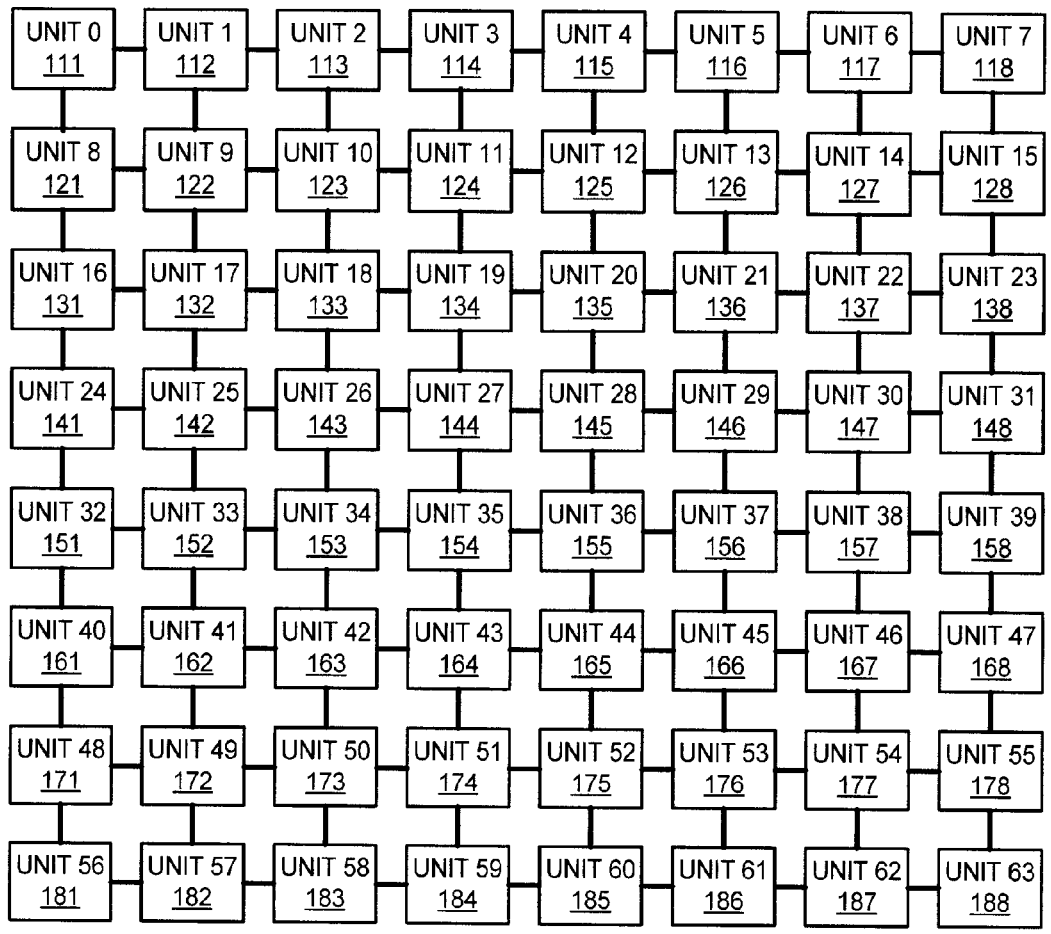
FIG. 2 is a block diagram illustrating an example of 64 nodes mapped out according to some network connectivity.
Figure 3:
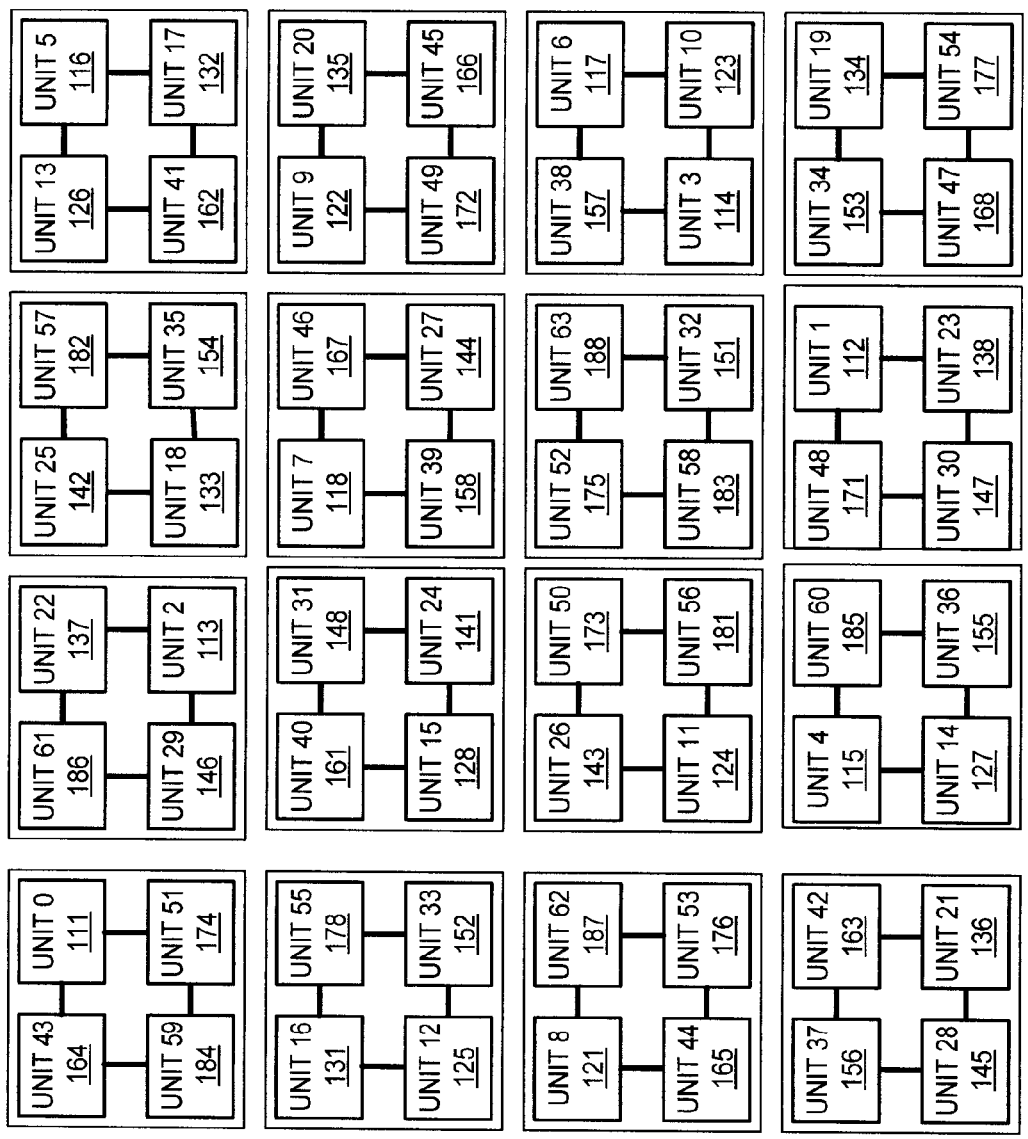
FIG. 3 is a block diagram illustrating an example of 64 nodes mapped out according to shared memory usage.

FIG. 2 and FIG. 3 illustrate an example of the multi-node computing system 10 comprising 64 nodes (i.e. units 0-63 (111-188)) that are mapped out according to network connectivity (FIG. 2) and then according to shared memory usage (FIG. 3). After running a test on the multi-node computing system 10 that identifies bad results on a number of nodes, the results can be marked on the various topologies. The network connectivity topology (FIG. 2) may show disparate clusters, but the shared memory topology (FIG. 3) may show a single cluster that coincides with a specific CPU or memory controller. The identification of the specific CPU or memory controller can be used to either perform additional targeted testing on that specific CPU or memory controller, perform some kind of repair, or it could be swapped out with another one and retested.

Figure 4:
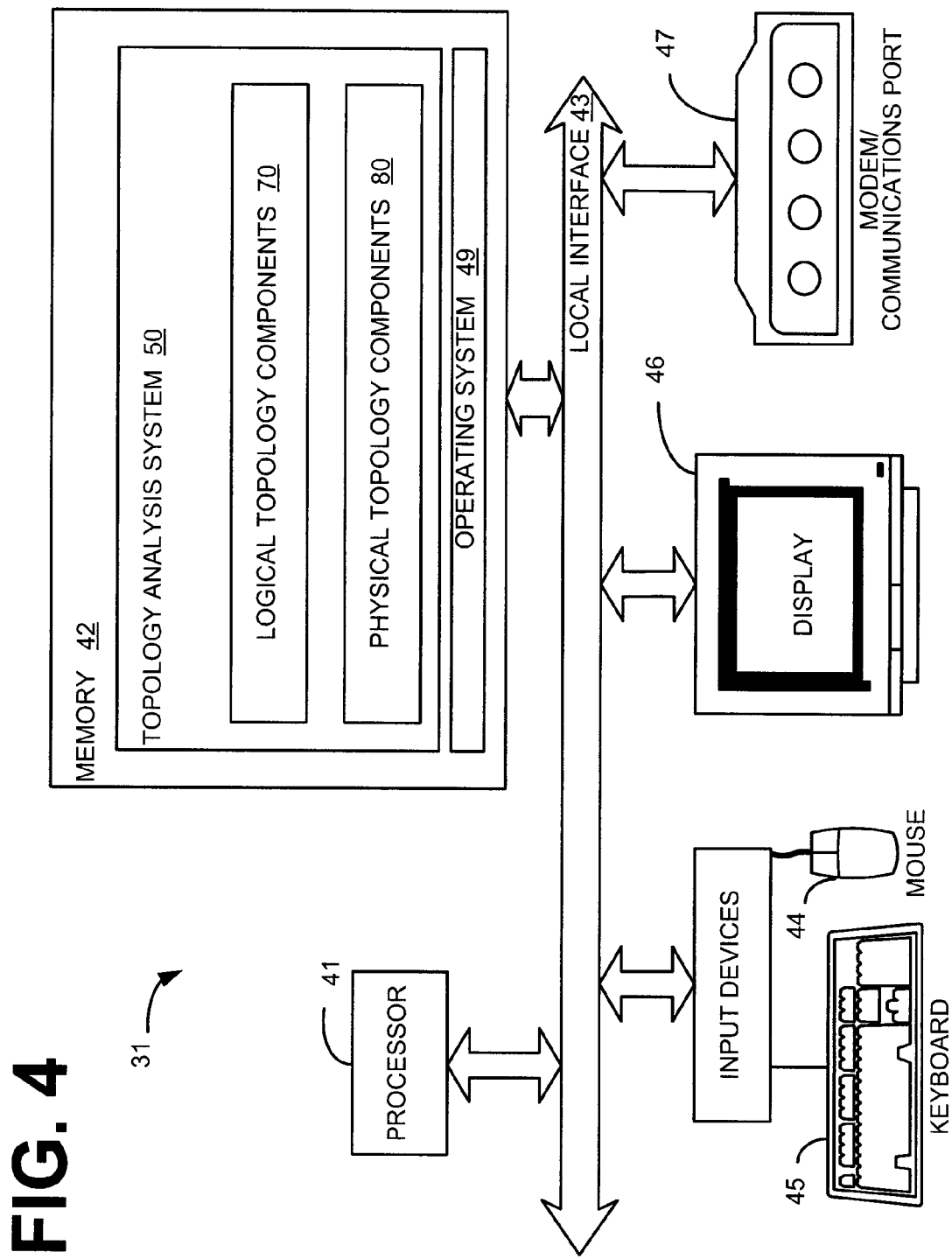
FIG. 4 is a block diagram illustrating an example of a computer utilizing the topology analysis system of the exemplary embodiment, as shown in FIG. 1.

FIG. 4 is a block diagram illustrating an example of a computer 11 in the multi-node computing system 10 utilizing the topology analysis system 50 of the exemplary embodiment, as shown in FIG. 1.

In the illustrated example, computer 31 contains an application, and a memory 42 that can be accessed by CPUs (11-19) and memory units (21-29) via interconnecting network 8. The CPUs (11-19) and memory units (21-29) may access the memory 42 over a interconnecting network 8, that may include but not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks. The CPUs (11-19) and memory units (21-29) may each be located at remote sites Generally, in terms of hardware architecture, as shown in FIG. 4, the computer 31 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the computer 31, and a semiconductor based microprocessor (in the form of a microchip) or a macroprocessor. Examples of suitable commercially available microprocessors are as follows: an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 42 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remotely from one another, but can be accessed by the processor 41.

The software in memory 42 may include one or more separate programs, each of which comprises an ordered listing of executable instructions for implementing logical functions. In the example illustrated in FIG. 4, the software in the memory 42 includes a suitable operating system (O/S) 49 and the topology analysis system 50 of the present invention. As illustrated, the topology analysis system 50 of the present invention comprises numerous functional components including, but not limited to, a logical topology components 70, and physical topology components 80.

A non-exhaustive list of examples of suitable commercially available operating systems 49 is as follows: (a) IBM z/OS™, z/VM™, AIX™ operating systems, which are trademarks of IBM Corporation; (b) a Windows operating system available from Microsoft Corporation; (c) a Netware operating system available from Novell, Inc.; (d) a Macintosh operating system available from Apple Computer, Inc.; (e) a UNIX operating system, which is available for purchase from many vendors, such as the Hewlett-Packard Company, Sun Microsystems, Inc., and AT&T Corporation; (f) a LINUX operating system, which is freeware that is readily available on the Internet; (g) a run time Vxworks operating system from WindRiver Systems, Inc.; or (h) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation).

The operating system 49 essentially controls the execution of other computer programs, such as the topology analysis system 50, and provides scheduling, input-output control, file and data management, memory management, and communication control and related services. However, it is understood by the inventors that the topology analysis system 50 of the present invention is applicable on all other commercially available operating systems.

The topology analysis system 50 may be a source program, executable program (object code), script, or any other entity comprising a set of computer program instructions to be performed. When the topology analysis system 50 is a source program, then the program is usually translated via a compiler, assembler, interpreter, or the like, which may or may not be included within the memory 42, so as to operate properly in connection with the O/S 49. Furthermore, the topology analysis system 50 can be written as (a) an object oriented programming language, which has classes of data and methods, or (b) a procedure programming language, which has routines, subroutines, and/or functions, for example but not limited to, C, C++, C#, Smalltalk, Pascal, BASIC, API calls, HTML, XHTML, XML, ASP scripts, FORTRAN, COBOL, Perl, Java, ADA, .NET, and the like. The computer program instructions may execute entirely on the computer 31, partly on the computer 31, as a stand-alone software package, partly on the computer 31 and partly on a remote computer or entirely on the remote computer or multi-node computing system 10. In the latter scenario, the remote computer may be connected to the multi-node computing system 10 through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, an NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the computer 31 is a PC, workstation, intelligent device or the like, the software in the memory 42 may further include a basic input output system (BIOS) (omitted for simplicity). The BIOS is a set of essential software routines that initialize and test hardware at startup, start the O/S 49, and support the transfer of data among the hardware devices. The BIOS is stored in some type of read-only-memory, such as ROM, PROM, EPROM, EEPROM or the like, so that the BIOS can be executed when the computer 31 is activated.

When the computer 31 is in operation, the processor 41 is configured to execute software stored within the memory 42, to communicate data to and from the memory 42, and generally to control operations of the computer 31 pursuant to the software. The topology analysis system 50 and the O/S 49 are read, in whole or in part, by the processor 41, perhaps buffered within the processor 41, and then executed.

When the topology analysis system 50 is implemented in software, as is shown in FIG. 4, it should be noted that the topology analysis system 50 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contains or stores a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

In an alternative embodiment, where the topology analysis system 50 is implemented in hardware, the topology analysis system 50 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 5:
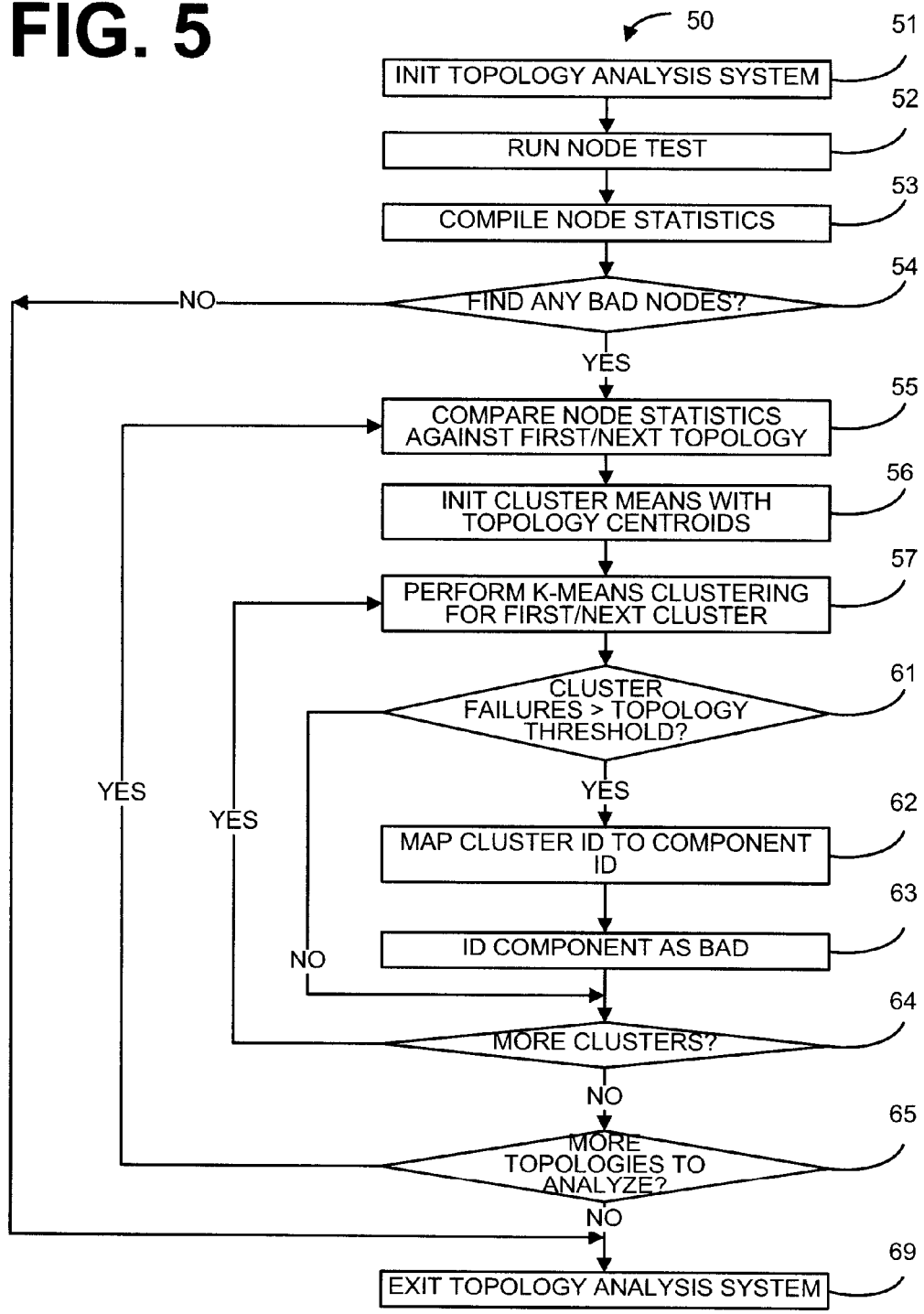
FIG. 5 is a flow chart illustrating the operation of an exemplary embodiment of the topology analysis system in the computer according to the principles of the present invention.

FIG. 5 is a flow chart illustrating the operation of an exemplary embodiment memory of the topology analysis system in the computer according to the principles of the present invention. The exemplary embodiments of the present invention provide that whatever test is able to identify the bad nodes, is first run on the entire system (good nodes and bad nodes). This test on the entire system will get a full set of data for the entire domain for all topologies. In one exemplary embodiment, each node will run the test and supply its result. In those instances where no response is supplied, the test would be considered a failure for that node or component. An external topology analyzer would then consolidate the statistics about node IDs and pass/fail results and would iteratively map out the nodes using the available node topologies. A clustering method is performed to search for clusters of bad nodes on each topology. The clusters are then matched up against the logical/physical component identifiers for each topology to identify potentially bad components. Those identified components can then have further action taken against them to correct the problem.

First, the topology analysis system 50 is initialized at step 51. This initialization includes the startup routines and processes embedded in the BIOS of the computer 31. The initialization also includes the establishment of data values for particular data structures utilized in the topology analysis system 50.

At step 52, the topology analysis system 50 runs the node test. This test on the entire system will get a full set of data for the entire domain for all topologies. In one exemplary embodiment, each node will run the test and supply its result. In those instances where no response is supplied, the test would be considered a failure for that node or component. At step 53, the topology analysis system 50 compiles all the node statistics in memory 42 or a database (not shown).

At step 54, it is determined if any bad nodes were found. If it is determined that no bad nodes were found, then the topology analysis system 50 proceeds to exit at step 69. However, if it is determined at step 54 that bad nodes were found, then the topology analysis system 50 compares the node statistics against the first/next topology to be analyzed at step 55. At step 56, the cluster means are initialized using the topology centroids as a starting value. The cluster means may change during the clustering algorithm (e.g. k-means clustering) as clusters are identified.

At step 57, the topology analysis system performs the K-means clustering for the first/next cluster for the current topology. At step 61, it is determined if the number of cluster failures is greater than the topology threshold. If it is determined at step 61 that the cluster failures were less than the topology threshold, then the topology analysis system 50 proceeds to step 64. However, if it is determined at step 61 that the number of cluster failures is greater than the topology threshold, then the topology analysis system maps the cluster ID to the component ID at step 62 and marks the ID component as bad.

At step 64, the topology analysis system 50 then determines if there are more clusters to be analyzed. If it is determined that there are more clusters to be analyzed, then the topology analysis system returns to repeat step 57-64. However, if it is determined at step 64 that there are no more clusters to be analyzed, then the topology analysis system 50 determines if there are more topologies to be analyzed at step 65. If it is determined at step 65 that there are more topologies to be analyzed, then the topology analysis system 50 returns to repeat steps 55-65. However, if it is determined that there are no more topologies to be analyzed, then the topology analysis system exits at step 69.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method for efficiently identifying the bad component(s) in a multi-node system embodied in a computer program product for execution on an instruction processing system, comprising a tangible storage medium readable by the instruction processing system and storing instructions for execution by the instruction processing system for performing the method comprising:
   assigning a unique ID to each of a plurality of nodes on the multi-node system;
   generating test statistics from a test on a plurality of nodes;
   comparing the test statistics for the plurality of nodes against a first topology to generate a first number of clusters of bad nodes;
   comparing the test statistics for the plurality of nodes against a second topology to generate a second number of clusters of bad nodes; and
   identifying the bad nodes by comparing the cluster sizes to a topology threshold.

2. The method in claim 1, wherein the comparing the test statistics for the plurality of nodes further comprises utilizing a clustering algorithm to identify a cluster of bad nodes.

3. The method of claim 2, wherein the clustering algorithm is a k-means algorithm.

4. The method in claim 1, wherein the generating test statistics further comprises utilizing data integrity to identify a cluster of bad nodes.

5. The method of claim 1, wherein the generating test statistics further comprises utilizing execution time to identify a cluster of bad nodes.

6. The method of claim 1, wherein the generating test statistics further comprises utilizing temperature to identify a cluster of bad nodes.

7. The method of claim 1, wherein the first topology is based upon physical connections and the second topology is based upon logical connections.

8. A system for efficiently identifying the bad component(s) in a multi-node system, comprising:
   a tangible storage medium readable by an instruction processing system and storing instructions for execution by the instruction processing system;
   an assigning module that assigns a unique ID to each of a plurality of nodes on the multi-node system;
   a test module that generates test statistics from a test on a plurality of nodes;
   a first topology analysis module that compares the test statistics for the plurality of nodes against a first topology to generate a first number of clusters of bad nodes;
   a second topology analysis module that compares the test statistics for the plurality of nodes against a second topology to generate a second number of clusters of bad nodes; and
   a bad node identification module that identifies the bad nodes by comparing the cluster sizes to a topology threshold.

9. The system of claim 8, wherein the bad node identification module further comprises utilizing a clustering algorithm to identify a cluster of bad nodes.

10. The system of claim 9, wherein the clustering algorithm is a k-means algorithm.

11. The system of claim 8, wherein the test module further comprises utilizing data integrity to identify a cluster of bad nodes.

12. The system of claim 8, wherein the test module further comprises utilizing execution time to identify a cluster of bad nodes.

13. The system of claim 8, wherein the test module further comprises utilizing temperature to identify a cluster of bad nodes.

14. The system of claim 8, wherein the first topology is based upon physical connections and the second topology is based upon logical connections.

15. A computer program product for efficiently identifying the bad component(s) in a multi-node system, the computer program product comprising:
   a tangible non-transitory storage medium readable by a computer system and storing instructions for execution by the computer system for performing a method comprising:
   assigning a unique ID to each of a plurality of nodes on the multi-node system;
   generating test statistics from a test on a plurality of nodes;
   comparing the test statistics for the plurality of nodes against a first topology to generate a first number of clusters of bad nodes;
   comparing the test statistics for the plurality of nodes against a second topology to generate a second number of clusters of bad nodes; and
   identifying the bad nodes by comparing the cluster sizes to a topology threshold.

16. The computer program product of claim 15, further comprising:
   utilizing a clustering algorithm to identify a cluster of bad nodes.

17. The computer program product of claim 16, wherein the clustering algorithm is a k-means algorithm.

18. The computer program product of claim 15, further comprising:
  utilizing data integrity to identify a cluster of bad nodes.

19. The computer program product of claim 15, further comprising:
  utilizing execution time to identify a cluster of bad nodes.

20. The computer program product of claim 15, wherein the first topology is based upon physical connections and the second topology is based upon logical connections.

* * * * *